Figure 1:
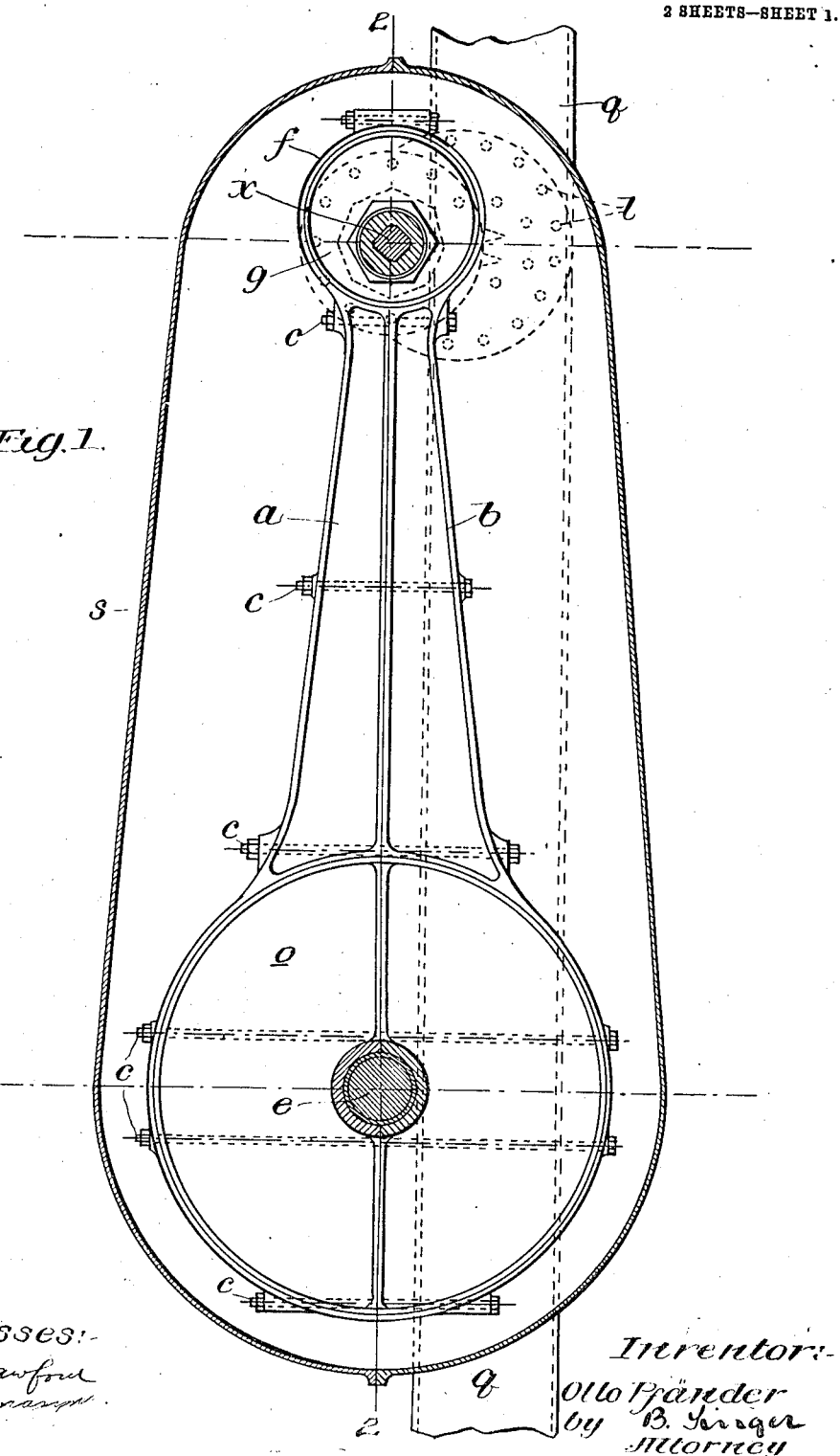

No. 844,892. PATENTED FEB. 19, 1907.
O. PFÄNDER.
TENSION DEVICE.
APPLICATION FILED SEPT. 15, 1905.

2 SHEETS—SHEET 1.

Witnesses:
C. H. Crawford
C. Hermann

Inventor:
Otto Pfänder
by B. Singer
Attorney

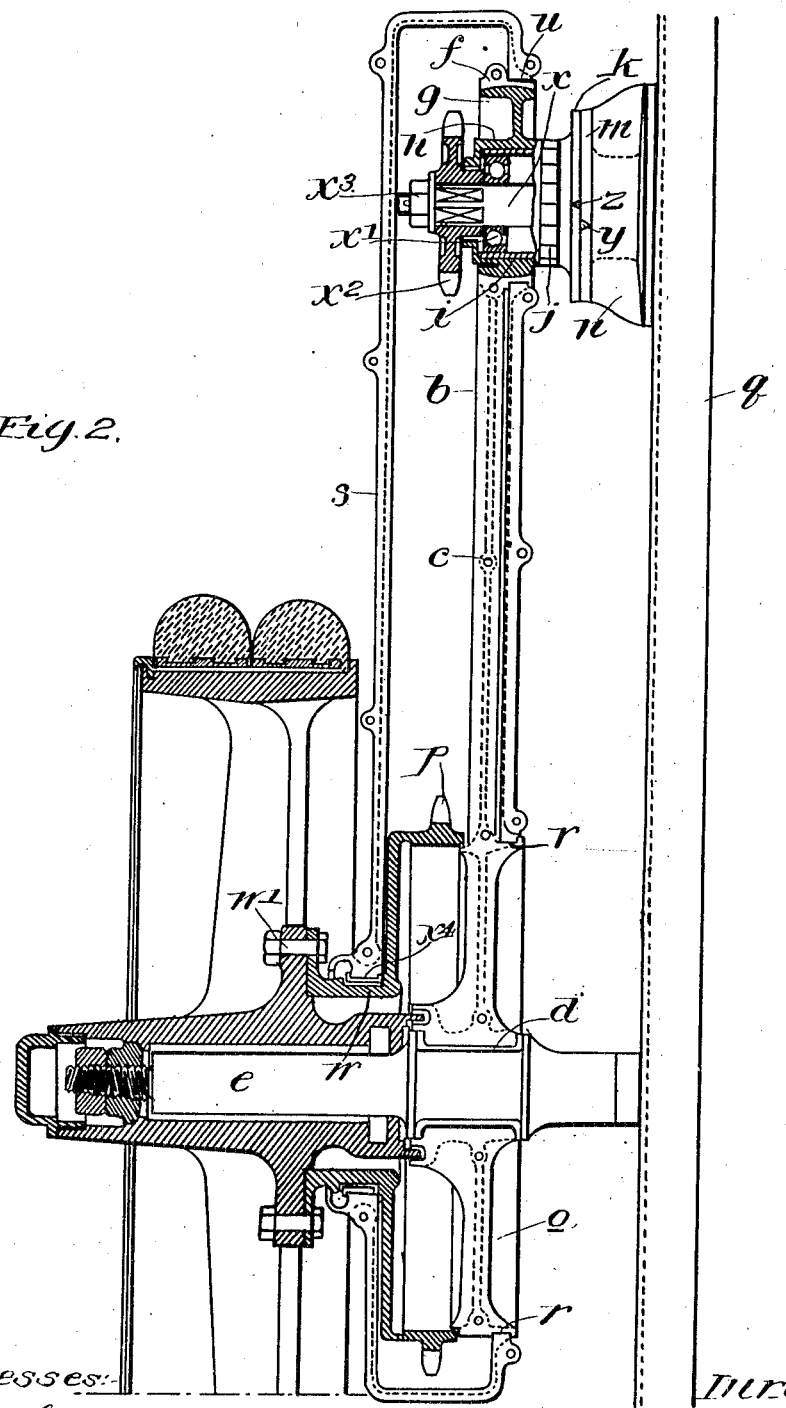

UNITED STATES PATENT OFFICE.

OTTO PFÄNDER, OF BRUSSELS, BELGIUM.

TENSION DEVICE.

No. 844,892.  Specification of Letters Patent.  Patented Feb. 19, 1907.

Application filed September 15, 1905. Serial No. 278,600.

*To all whom it may concern:*

Be it known that I, OTTO PFÄNDER, a subject of the German Emperor, residing at Brussels, in the Kingdom of Belgium, engineer, have invented certain new and useful Improvements in Tension Devices, for which application has been made in Belgium at the 15th January, 1905, in Great Britain at the 27th January, 1905, and in Germany at the 8th July, 1905.

This invention relates to improvement in tension means for chain power-transmission devices for automobiles, bicycles, or any form of power-transmission device wherein it is desirable to regulate and control the tension of the chain.

The invention consists in the provision of a tension device of this character wherein the tension of the chain is regulated by varying the distance between the centers of the wheels over which the chain runs; and the invention comprises a tension-rod revolubly mounted at one end upon the shaft of one wheel and carrying at its opposite end a revolubly-mounted and adjustable eccentric member adapted to receive the shaft of the remaining wheel, together with means for adjusting and holding the eccentric member in prescribed positions.

The invention will be more fully described in connection with the accompanying drawings and will be more particularly pointed out and ascertained in and by the appended claims.

In the drawings, Figure 1 is a side longitudinal section of the device of my invention, showing the same mounted upon the driving-shaft and rear axle of an automobile. Fig. 2 is a longitudinal sectional view of a driving-shaft and axle of an automobile, showing a portion of the frame in elevation and one of the rear wheels and its bearings in section and the device of my invention mounted upon said axle and shaft, said figure being a section on the line 2 2 of Fig. 1.

In the drawings, $q$ represents a portion of the frame of the vehicle, $e$ one of the axles, and $x$ the driving-shaft. A tension-rod, preferably comprising split members $a$ and $b$, is mounted on said axle and shaft, the axle end of said rod comprising a disk $o$, provided with a bushing $d$, interposed between the disk and the axle $e$, the tension-rod being mounted in such a manner as to permit free rotation of the axle. The forward end of the rod terminates in a collar or strap $f$, in which an eccentric member $g$ is revolubly mounted. Said eccentric $g$ is provided with a flange $h$, through which an annular flange $i$ projects integral with a stationary hub $n$, fixed to the frame $q$. Between the flange $i$ and the driving-shaft $x$ is interposed a ball-bearing $x'$, which may be of any convenient form. The flange $h$ extends inwardly over the flange $i$ and terminates in an annular adjusting-rim $k$, fitting face to face with a disk $m$ of like diameter which is rigid with the hub $n$. The flange $h$ is provided intermediate the member $g$ and the rim $k$ with a hexagonal or other like portion $j$, to which a wrench may be applied, and the abutting rims $k$ and $m$ are provided with indexes $z$ and $y$, which indicate the adjustment of the eccentric. Bolts $l$ passing through a plurality of holes formed in the abutting rims $k$ and $m$ are provided to anchor the eccentric $g$ in its adjusted position. When it is desired to anchor said member, the bolts are removed and the wrench is applied to the part $j$ until the required tension is effected, whereupon the bolts are inserted in place and the rims $k$ and $m$ are locked in their adjusted position. The outer end of the shaft $x$ carries the usual chain-wheel $x^2$, which, as shown, is mounted upon a squared portion of the driving-shaft and secured in place by a nut and pin $x^3$, although it will be obvious that any like efficient means for securing the chain-wheel $x^2$ may be substituted for that shown.

$p$ indicates the chain-wheel connected with the rear driving-wheel of the vehicle, the same having a flange $w$ bolted to the hub of said rear wheel at $w'$, as shown in Fig. 2. The split sections of said tension-rod are held together by bolts $c$, which pass through the sections, as clearly shown in Fig. 1. As shown, the tension rod and chain are housed by a casing $s$, formed in two parts, which are bolted together in any suitable manner. The inner wall of the forward end of said casing has bearing at $u$ upon the tension-rod, and the rear end has bearing at $v$ upon said rod. The outer wall of said casing $s$ extends beyond the driving-shaft $x$, inclosing the outer end of the same, and has bearing at its rear end at $x^4$ upon the chain-wheel $p$.

I declare that what I claim is—

1. A device of the class described comprising in combination, an axle, a driving-shaft, a spacing or tension rod revolubly mounted at one end on said axle, and a revoluble member for the opposite end of said rod eccentrically apertured and adapted to receive the driving-shaft.

2. A device of the class described comprising in combination, an axle, a driving-shaft, a spacing or tension rod revolubly mounted at one end on said axle, a revoluble member for the opposite end of said rod eccentrically apertured and adapted to receive the driving-shaft, and means for adjusting said revolubly-mounted member.

In testimony whereof I affix my signature in presence of two witnesses.

OTTO PFÄNDER.

Witnesses:
   S. PARETTE,
   GREGORY PHELAN.